Feb. 21, 1961  W. C. FURNAS ET AL  2,972,664
MANUAL MOTOR STARTER WITH OVERLOAD PROTECTION
Filed June 8, 1959  4 Sheets-Sheet 1
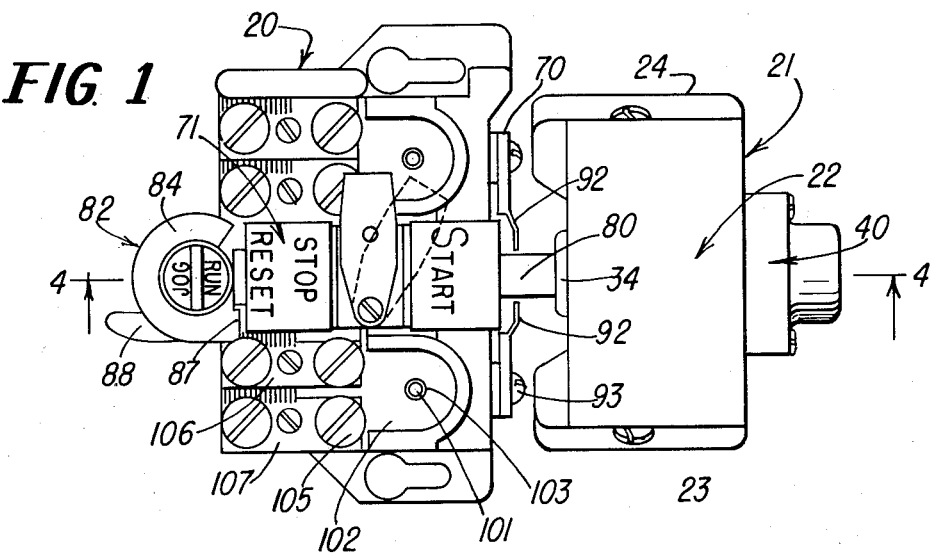
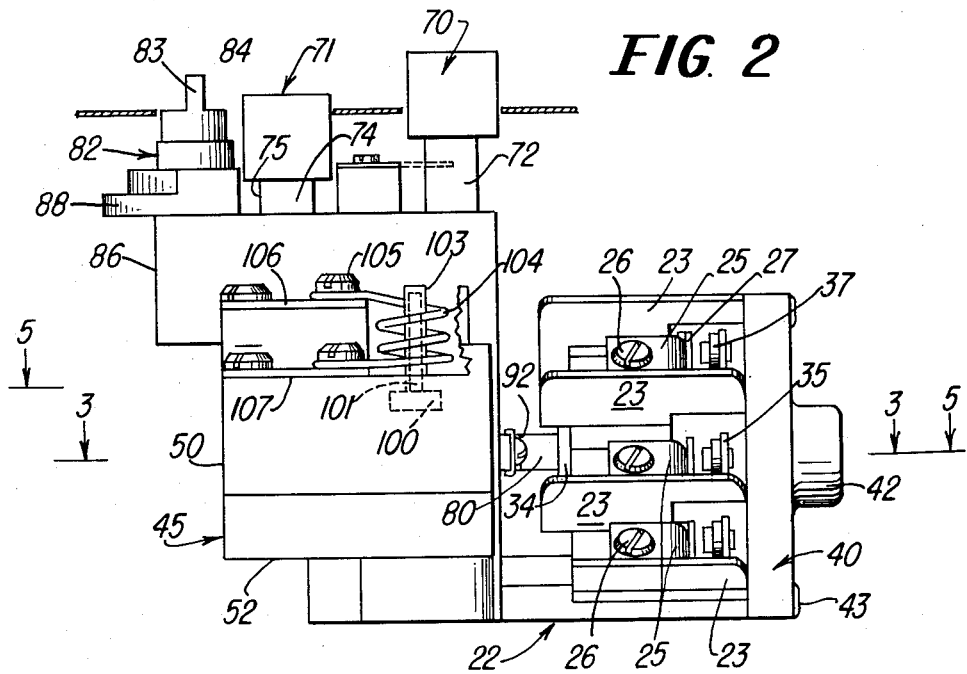
INVENTORS
William C. Furnas
Irving W. Krieger
BY
Byron, Hume, Groen & Clement
Attys.

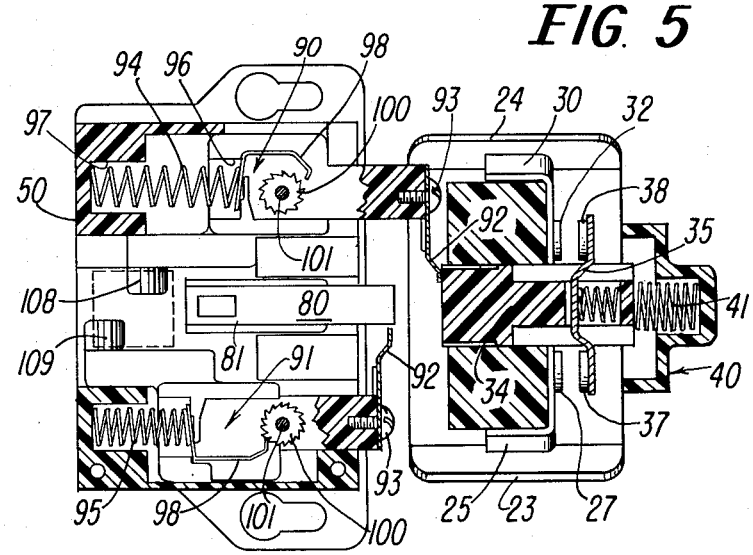
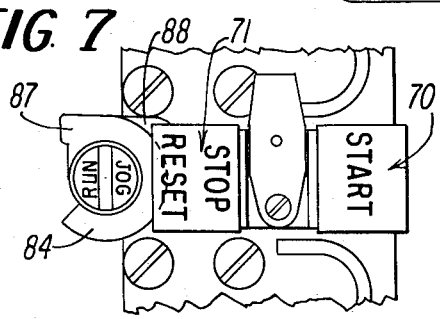
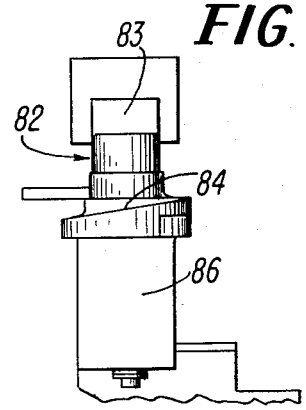
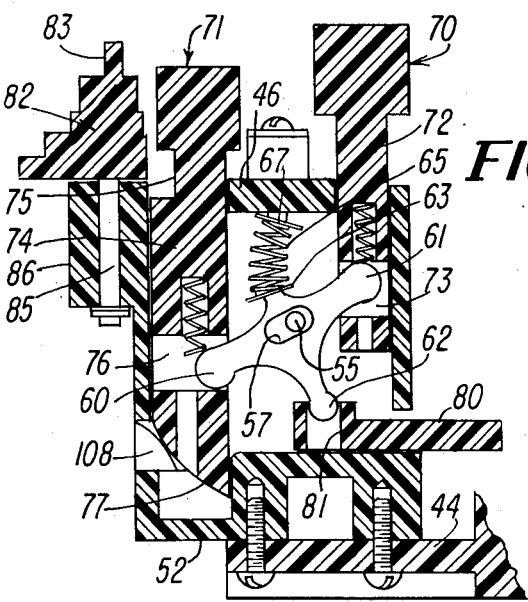

Feb. 21, 1961     W. C. FURNAS ET AL     2,972,664
MANUAL MOTOR STARTER WITH OVERLOAD PROTECTION
Filed June 8, 1959     4 Sheets-Sheet 4

INVENTORS
William C. Furnas
BY Irving W. Krieger

Byron, Hume, Groen & Clement
Attys.

United States Patent Office 2,972,664
Patented Feb. 21, 1961

2,972,664
MANUAL MOTOR STARTER WITH OVERLOAD PROTECTION

William C. Furnas, Batavia, and Irving W. Krieger, St. Charles, Ill., assignors to Furnas Electric Company, Batavia, Ill., a corporation of Delaware Filed June 8, 1959, Ser. No. 818,677
10 Claims. (Cl. 200—124)

The invention relates to electrical switches for controlling the starting and stopping of electric motors and the like, and has reference in particular to a start and stop switch actuator of the manually actuated type having combined therewith jogging structure in addition to thermal overload release means with provision for resetting the said overload release means in the event of actuation thereof.

A general object of the invention is to provide a new and improved start and stop switch actuator for controlling electric motors and the like, which will be rugged and durable in construction, so that the same will not readily get out of order but will operate satisfactorily for years without requiring repair or replacement.

Another object of the invention is to provide a manual start and stop switch actuator of the toggle type having a spring energized toggle member which is actuated from one side of a dead center position to the opposite side by respective reciprocation of start and stop push buttons and wherein jogging mechanism is so combined with the stop button that the said button is locked against movement when the jogging mechanism is operative so that only limited movement of the start button is possible for jogging purposes.

Another object of the invention resides in the provision of a switch actuator as described, wherein the spring energized toggle member produces quick action of the reciprocable actuating bar for rapidly opening and closing the contacts of a switch and wherein the toggle member is resiliently held in either of its two positions to definitely position and maintain the actuating bar in either switch open or switch closed positions.

Another object of the invention is to provide a switch actuator for effecting the opening and closing of electrical switches and which will incorporate jogging mechanism essentially consisting of a rotatable helical member for operative association with the stop-reset button.

Another object of the invention is to provide a start and stop switch actuator having combined therewith thermal overload release means and which are so constructed and arranged with respect to the stop-reset button that the same functions as resetting means for resetting the overload release in the event of its actuation.

A further object of the invention is to provide a start and stop switch actuator wherein the start and stop buttons have operative connection, respectively, with a reciprocable switch actuating bar by means of the spring energized toggle member and wherein the resetting of the reciprocable overload release means is effected by a camming action between the stop button and the said overload release means.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a top plan view showing the switch actuator of the invention in combination with switch structure for controlling a three phase alternating current;

Figure 2 is a side elevational view of the combination switch actuator and switch structure as shown in Figure 1;

Figure 5 is a horizontal sectional view taken substantially along line 5—5 of Figure 2 and showing one of the thermal overload release members in tripped circuit opening position;

Figure 6 is a vertical sectional view similar to Figure 4 but illustrating the position of the parts with the stop button depressed to open the contacts of the switch mechanism;

Figure 7 is a fragmentary view in plan illustrating the operative position of the rotatable jogging button;

Figure 8 is a fragmentary view in front elevation showing the rotatable jogging button in a non-operative position;

Figure 3:
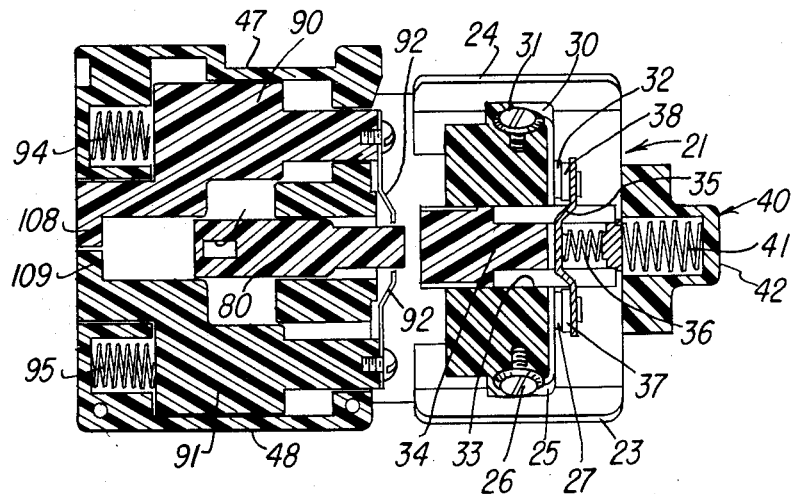
Figure 3 is a horizontal sectional view taken substantially along line 3—3 of Figure 2, but showing the switch actuating bar in a retracted circuit closing position.

The switch actuator of the invention generally indicated by numeral 20, Figure 1, is illustrated in operative association with switch mechanism 21, said mechanism being capable of controlling three phase alternating currents, although control of single phase currents is also possible by proper preselection of certain of the various contacts. The body portion of the contact block 22 of the switch mechanism is preferably formed of relatively hard insulating material, such as a noncombustible plastic, and to accommodate the stationary contact members the contact block is provided with a plurality of side flanges 23 and 24 on respective sides of the same. The side flanges 23 extend outwardly and upwardly at approximately a forty-five degree angle to form separate channels in which the stationary contact members 25 are located, Figures 2 and 3. Each of the contact members 25 have a terminal screw 26 for attaching an electric conductor to the member and each said member to the rear of the contact block is additionally provided with a terminal contact 27 which may consist of silver or other metal of good electrical conductivity. The side flanges 24 likewise extend outwardly and upwardly at about a forty-five degree angle and the channels formed thereby receive the stationary contact members 30. Terminal screws for these contact members are indicated by the numeral 31 and the terminal contacts by 32.

The contact block 22 is cored centrally as at 33 (Figure 3) from front to rear and the armature 34 is positioned within the opening thus formed and the same is mounted for reciprocating movement to effect an opening and closing of the contacts of the switch mechanism. For this purpose the armature carries a plurality of metal strips 35, three being shown in the illustrated embodiment, and which are individually backed by coil springs 36 so that the metal strips are in effect resiliently carried by the armature. A terminal contact 37 is fixed to each strip on one side thereof for coaction with the terminal contacts 27 of the stationary members 25. Terminal contacts 38 are fixed to the metal strips on the opposite side thereof and these contacts coact with terminal contacts 32 provided by the members 30. The switch mechanism 21 is of the normally closed type since the rear backing plate 40 carries a coil spring 41 and which is confined between the armature 34 and the rear wall 42. The backing plate is releasably secured to the contact block by screws 43. The effect of the coil spring 41 is to yieldingly force the armature towards the left, Figures 3 and 4, and accordingly, the movable contacts 37 and 38 are caused to engage the fixed contacts 27 and 32, respectively, to close electric circuits such as may be connected to the said contacts. To open the electric circuits the armature 34 must be actuated in a direction towards the right against the tension of coil spring 41 and such actuation of the armature is conveniently accomplished by the switch actuator 20 of the invention which will now be described in detail.

The upwardly and outwardly directed side flanges 23 and 24 provide upwardly directed open channels for accommodating the stationary contact members and thus the members are readily visible to the operator to thereby facilitate the connection or disconnection of conductors thereto. The side flanges also assist in separating and insulating the stationary contact members from each other. For a more particular description of the switch mechanism 21 reference is made to Patent No. 2,927,180, granted to William C. Furnas on March 1, 1960, and entitled Magnetic Switch Assembly.

Figure 4:
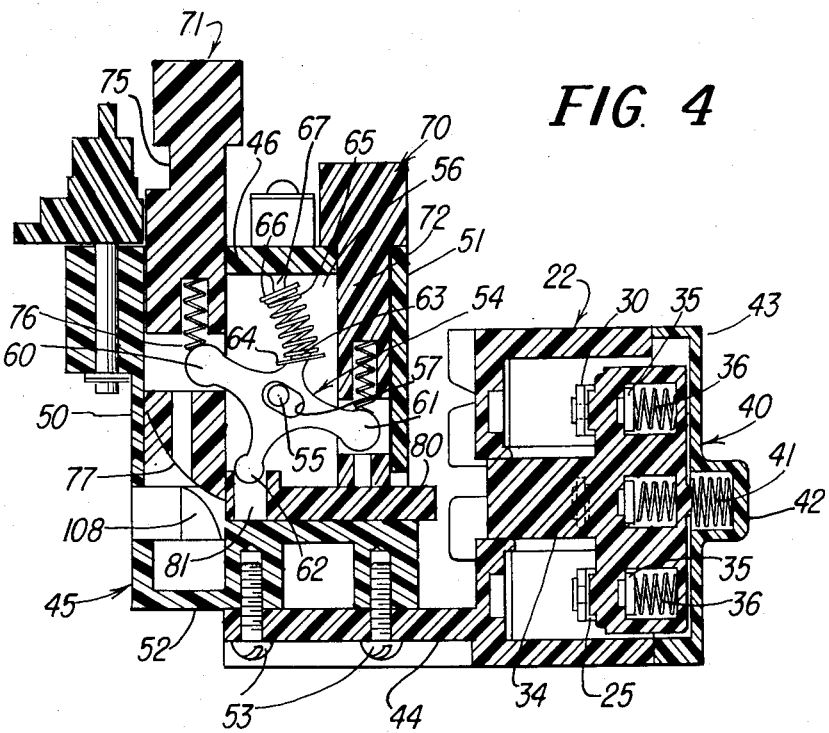
Figure 4 is a vertical sectional view taken substantially along the line 4—4 of Figure 1 and illustrating the position of the toggle member with the switch actuating bar in retracted circuit closing position.

The frame and housing of the switch actuator 20 is indicated by numeral 45, Figures 2 and 4, the same consisting of a top wall 46, side walls 47 and 48, front and rear walls 50 and 51, and a bottom wall 52. As best shown in Figure 4 the contact block 22 has a forwardly extending portion 44 and said portion is secured to bottom wall 52 of the switch actuator by the screws 53 so that the two units are fixedly secured one to the other in proper spaced relation for satisfactory operation of the switch actuator. The housing 45 journals a toggle member generally indicated by numeral 54, the said toggle member being supported and mounted for rotation by means of the stud 55 fixed to an intermediate wall 56 extending parallel to and between side walls 47 and 48. An oblong opening 57 is formed in the toggle member 54 and by means of this opening the member is journalled on the stud 55. Accordingly, it will be understood that the toggle member will not only rotate on the stud as an axis, but will also have limited movement bodily relative to the stud. The toggle member is formed with three arms which terminate in bulbous portions 60, 61 and 62, the bulbous portions 60 and 61 being disposed on respective sides of the same, whereas portion 62 depends centrally of the member. The pivot point 63 is provided by the toggle member, the said pivot point being located between the two side arms and in alignment with the depending bulbous portion 62. The pivot point retains the base cap 64 of the toggle coil spring 65 and which is similarly provided with a top base cap 66. The base cap 66 is engaged by the depending pivot point 67 so that the toggle member is resiliently biased by the said coil spring 65 into either one of its two off center positions. In fact, the manner in which the coil spring is engaged by the pivot pins 63 and 67 renders it impossible for the toggle member to attain a dead center position. When the pivot points are vertically aligned, the toggle member will rotate quickly to one side or the other and therefore, when oscillatory movement is imparted to the toggle member it will produce a flip-flop action of the toggle member for actuating a reciprocable switch actuating bar.

The housing 45 of the actuator mounts a pair of buttons in spaced relation, one of which is identified as the start button, numeral 70 (Figure 6), and the other as the stop-reset button numeral 71. Button 70 is formed integral with a stem portion 72 and which is provided with a transverse slot 73 adjacent its lower end for receiving the bulbous portion 61 of the toggle member. In a similar manner the stop-reset button 71 is formed integral with its stem portion 74 and which is provided with the notch 75 and with the slot 76, the said slot accommodating the bulbous portion 60 of the toggle member. The buttons 70 and 71 are each recessed for receiving and mounting a coil spring such as 78 and 79 respectively. Coil spring 78 has contact with portion 60 whereas coil spring 79 has contact with portion 61. The lower end of the stem portion 74 is rounded or curved as at 77 to provide an arcuate camming surface, the purpose of which will be presently described.

The bottom wall 52 of the housing supports the reciprocable switch actuating bar 80, the same having opening 81 formed in its enlarged end. The bulbous portion 62 of the toggle member has location within the opening 81 and, accordingly, oscillating movement of the toggle member will reciprocate the bar 80. For example, in Figure 4 the start button 70 has been depressed locating the toggle member in a left hand off center position which effects retraction of the bar 80. In Figure 6 the stop-reset button has been depressed and thus the toggle member is located in a right hand off center position, the result of which is to cause bulbous portion 62 to move the bar 80 into a projected position. This reciprocating movement of the bar 80 will produce similar movement of the armature 34, since when the units are fixedly connected as shown in Figure 4 the retracted position of the bar 80 allows the armature 34 to move to the left whereby the contacts of the switch mechanism close, and thus the motor, or the like, such as may be electrically connected to a source of power by the switch mechanism will be energized by depressing the start button 70. However, as shown in Figure 6, a depressing of the stop-reset button 71 will project the bar 80, and, accordingly, the bar is caused to contact armature 34 moving the same into a position towards the right for separating the contacts of the switch mechanism. As previously described the toggle spring 65 not only effects a flip-flop action of the toggle member 54 for reciprocating the bar 80 but the spring also yieldingly maintains the toggle member in either of its two off center positions so that the push buttons are held in their actuated positions until manually manipulated by the operator.

The motor starter of the invention is equipped with jogging mechanism for the purpose of intermittently closing the switch contacts to thereby jog or rotate the motor into a desired position. The jogging mechanism is best shown in Figures 4, 6, 9 and 10 and essentially consists of a rotatable helix 82 having a flattened portion 83 providing a finger grip for rotating the same and also having a spiraling or helical flange 84 for coaction with the notch 75 of the stop button. The rotatable helix 82 is journalled by shaft 85 in portion 86 integral with the front wall 50 and thus the helix can be rotated by the operator either clockwise or counterclockwise to locate the same in an operative or in an inoperative position, respectively. The inoperative position of the jogging helix 82 is shown in Figure 1 wherein it will be observed that the stop portion 87 is in contact with the stop-reset button 71. With the jogging mechanism in this position the operator can actuate the start and stop buttons without interference from the rotatable helix. However, by rotating the helix in a clockwise direction, Figures 1 and 7, the helical flange 84 is located within the notch 75 and, accordingly, the stop button is locked against vertical movement when the stop finger 88 contacts the stop button 71 as shown in Figure 7. Although the stop button is locked against reciprocating movement, nevertheless the start button can be actuated to a limited extent by structure which is unique to the present invention. The said structure includes the toggle member 54 and the bulbous portions 60 and 61 provided thereby and which have location within the slots 76 and 73 formed in the start and stop buttons, respectively. The slots are sufficiently large as regards their vertical extent to permit the said limited actuation of the start button. More particularly the slots 73 and 76 are larger in vertical height than the bulbous portions 61 and 60 which have location within the slots and this permits limited movement of the toggle member even though the stop-reset button is locked against vertical movement.

Figure 9:
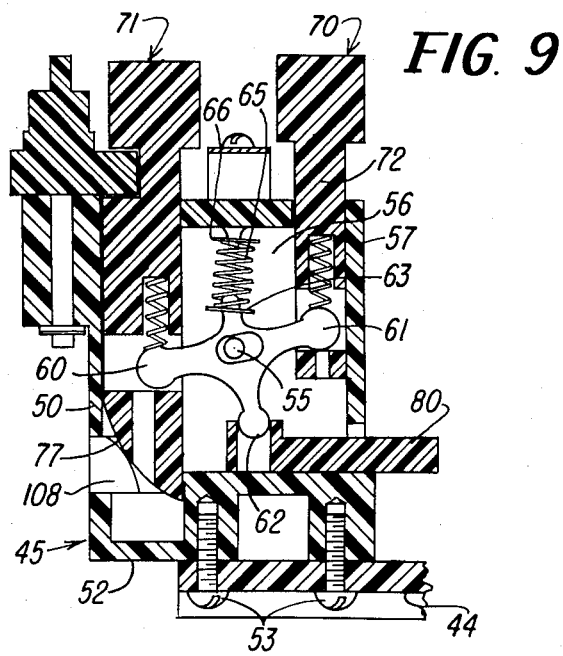
Figure 9 is a vertical sectional view showing the push button slides and toggle member in elevation and illustrating the position of the parts when the jogging button is rendered operative.
Figure 10:
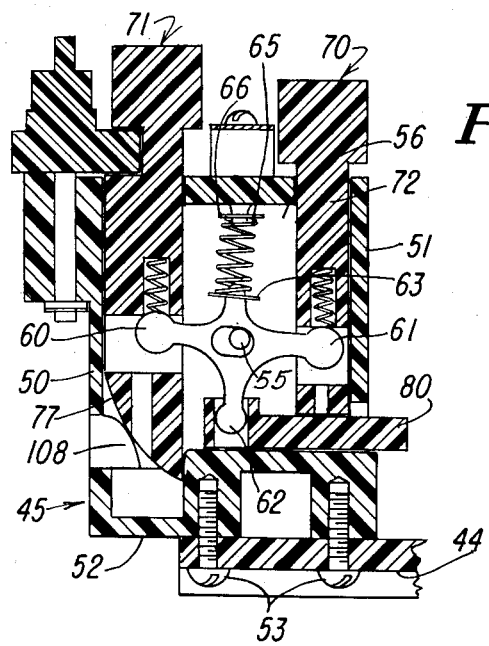
Figure 10 is a vertical sectional view showing the push button slides and toggle member in a jogged position caused by actuation of the start button slide.

Figure 9 illustrates the position of the parts when the jogging button is first located in an operative position. The toggle member is located in a partial off-center position previously described as a right hand off-center position, the result of which is to project the bar 80 to a partial extent. This partial extent of projection of bar 80 is sufficient to hold the armature 34 to maintain the switch contacts open. Accordingly, with the jogging mechanism rendered operative the toggle mechanism is nevertheless held in a position where the reciprocable bar 80 still holds the switch contacts in an open position. When the start button is depressed as shown in Figure 10, the toggle member is oscillated to a partial extent and within the right-hand off-center position. As a result, the bar 80 is partially retracted, at least sufficiently to allow the contacts to close, whereupon the motor is energized. For deenergizing the motor it is only necessary for the operator to release the start button which will move upwardly under the tension exerted by the toggle spring 65 and the tension exerted by the coil spring 79 to project bar 80 and again open the contacts of the switch. It will be observed that the coil spring 65 retains substantially its same curvature and which remains on the same side of a dead center position for both jogging positions Figures 9 and 10. Additional jogging of the motor can be effected by again depressing the start button and then releasing the same and the motor starter can be conveniently returned to a normal running condition by rotating the jogging mechanism to its inoperative position of Figure 1.

In the motor starter or switch actuator as described, the stop button 71 is capable of performing a dual function when depressed. In the first instance it effects actuation of the toggle member to a position as shown in Figure 6 which projects the bar 80 to open the contacts. Secondly, the terminal end 77 of the stem 74 of the said push button functions as a camming shoulder for camming the overload release members 90 and 91 into a reset position in the event either one or both of the members may have been tripped. As best shown in Figures 3 and 5, each of said overload release members is provided with a finger 92 fixed by the screw 93 to its projecting end and which fingers are disposed inwardly, being directed towards the reciprocable bar 80. As a result the fingers 92 in addition to the bar 80 are aligned with the armature 34 of the switch mechanism, and, accordingly, upon tripping of the overload release members they are caused to move into a projected position whereupon the fingers 92 will engage the armature, moving the same into an open contact position. Each of the overload release members is resiliently tensioned by a coil spring, such as 94 for member 90 and 95 for member 91. One end of each spring is located within a recess such as 96 provided in the member, whereas the opposite end of each spring is located within a similar recess 97, being formed however in the housing of the actuator adjacent the rear wall 50. The action of the springs 94 and 95 is to yieldingly project the members to effect actuation of the armature and opening of the switch contacts. However, a heat responsive spindle assembly is associated with each member and the action of the assembly is to latch the member in a retracted position against the tension of the coil springs. For this purpose each member carries a resilient pawl 98, the bent end 99 of which is located in contact with the bottom wall of recess 96 and the coil spring 94 or 95 thus assists in releasably retaining the pawl member 98 in proper assembled position on its overload release member. A ratchet wheel 100 is located in position for coaction with each pawl 98 and said ratchet wheel is fixed to a shaft 101 which extends upwardly through a top wall 102 of the housing to project above the same as shown in Figure 2. The shaft extends within the barrel 103 which is fixedly mounted on wall 102 and it will be observed that the shaft is spaced from the inside surface of the barrel so that the shaft can be sealed thereto by eutectic solder which will occupy the space between the parts. The heating coil 104 surrounds the barrel 103, having spaced relation therewith and the coil is connected into the electric circuit by screws 105 which connect the said coil to the terminals 106—107. By reason of the solder which seals the shaft 101 to the barrel 103, the ratchet 100 is thereby prevented from turning and the ratchet pawl 98 will have such coaction with the ratchet wheel as to maintain the overload release members in a reset or latched position such as shown in Figure 3. In such position of the members it will be understood that the coil springs 94 and 95 will be compressed to properly tension the latched members. Should an overload condition develop in an electric circuit controlled by the present device, the heating coil 104 will melt the eutectic solder, releasing shaft 101, whereupon the ratchet wheel 100 is free to rotate. The coil spring either 94 or 95 will thereupon move its member in a direction toward the right causing the finger 92 of the member to contact the armature and open the switch contacts. In Figure 5 member 90 is shown in a tripped contact opening position, whereas member 91 is shown as latched.

The overload release members are conveniently mounted for reciprocating movement on the smooth inside surface of the base wall 52 of the housing, and, in addition to the structure as described, each member is provided with a camming extension 108 for member 90 and 109 for member 91. The extensions are located directly below the stem 74 of the stop-reset button and when the members are in latched position the extensions do not interfere with the actuation of the button. However, when a member is tripped and is moved into a right hand position as shown in Figure 5 for member 90, the extension is located directly under camming shoulder 77 and is so located that the stop button is operative upon being depressed to cam the extension and reset the member. In other words, a camming action takes place with respect to the rounded terminal end 77 and the curved apron of the extension 108. Accordingly, it is only necessary to depress stop button 71 and effect a camming of a tripped overload release member into its reset position.

We claim:
1. In a manual actuator for controlling the actuation of normally closed switch contacts, in combination, a toggle member journalled for oscillating movement, a resilient coil spring in contact with the toggle member for tensioning the member into off-center positions on respective sides of a central plane passing through the journalling axis, a stop push button slide located on one side of the member and operatively connected to the toggle member, a start push button slide located on the other side of the member and also operatively connected thereto, a reciprocable bar having a retracted and a protruded position, said bar being operatively connected to the toggle member and being reciprocated into a protruded position by actuation of the stop push button slide to locate the toggle member in one of its off-center positions, said bar being reciprocated into a retracted position by actuation of the start push button slide to locate the toggle member in the other of its off-center positions, a rotatable jogging button for locking the stop push button slide against actuation when the jogging button is rendered operative, and said operative connections between the push button slides and the toggle member being so constructed and arranged that with the jogging button operative only limited actuation of the start push button slide is possible to partially retract the reciprocable bar from its protruded position.

2. A manual actuator as defined by claim 1, wherein the rotatable jogging button when rendered fully operative locates the stop push button slide in a partially actuated position and locks the stop slide in said position, whereby the reciprocable bar is in a partially protruded position when the jogging button is fully operative.

3. A manual actuator as defined by claim 1, wherein the rotatable jogging button when rendered fully operative locates the stop push button slide in a partially actuated position and locks the stop slide in said position, whereby the reciprocable bar is in a partially protruded position when the jogging button is fully operative, and wherein the limited actuation of the start push button slide is effected without oscillating the toggle member into its other off-center position.

4. In actuating means for switch mechanism, the combination including a housing, a stop slide mounted by the housing for reciprocating movement in a longitudinal direction to and from retracted and extended positions, a start slide also mounted by the housing for reciprocating movement parallel to that of the stop slide and to and from retracted and extended positions, a toggle member journalled by the housing at a location between the stop and start slides adjacent one end thereof, means pivotally connecting the toggle member with the stop and start slides respectively whereby reciprocating movement of the slides will effect oscillating movement of the toggle member, a resilient coil spring in associated relation with the toggle member for tensioning the member into off-center positions on respective sides of a central plane passing through the journalling axis, whereby when said toggle member is in one off-center position the stop slide is retracted and the start slide is extended and when the toggle member is in its other off-center position the stop slide is extended and the start slide is retracted, a reciprocable switch actuating bar mounted by the housing for movement in a plane at approximately right angles to the movement of the slides, means pivotally connecting the switch actuating bar to the toggle member so that oscillating movement of the member will alternately project and retract the said bar, a rotatable jogging button for locking the stop slide against actuation when the jogging button is rendered operative, and said pivotal connections between the slides and the toggle member being so constructed and arranged that with the jogging button operative only limited actuation of the start slide is possible to partially retract the reciprocable bar from its protruded position.

5. In actuating means for switch mechanism as defined by claim 4, wherein the rotatable jogging button when rendered fully operative locates the stop slide in a partially extended position and locks the stop slide in said position, whereby the reciprocable bar is in a partially protruded position when the jogging button is fully operative.

6. In actuating means for switch mechanism as defined by claim 4, wherein the rotatable jogging button when rendered fully operative locates the stop slide in a partially extended position, whereby the reciprocable bar is in a partially protruded position when the jogging button is fully operative, and wherein the limited actuation of the start slide is effected without oscillating the toggle member into its other off-center position.

7. In actuating means for switch mechanism having normally closed switch contacts, said actuating means including a housing, a toggle member journalled by the housing for flip-flop oscillating movement with respect to a dead-center position, a pair of spaced push button slides reciprocably mounted by the housing and disposed on respective sides of the toggle member, means pivotally connecting each slide to the toggle member, resilient means in associated relation with the toggle member for yieldingly biasing and respectively holding the member in either of its two off-center positions, a reciprocable switch actuating bar also mounted by the housing for movement in a plane at right angles to that of the push button slides, said bar being operatively connected to the toggle member and having a retracted and protruded position, said bar being reciprocated into a protruded position when the toggle member is located in one of its off-center positions, and said bar being reciprocated into a retracted position when the toggle member is located in the other of its off-center positions, a thermal overload release member mounted by the housing for reciprocating movement in a plane parallel to the switch actuating bar, resilient means for yieldingly forcing the release member into a protruded position, a heat responsive spindle assembly supported by the housing and operative to latch the said release member in a retracted position, and said release member and one of the push button slides being so constructed and arranged that actuation of the slide to oscillate the toggle member is effective to cam the release member into a retracted position.

8. In actuating means for switch mechanism having normally closed switch contacts, said actuating means including a housing, a stop slide mounted by the housing for reciprocating movement to and from retracted and projected positions, a start slide also mounted by the housing for reciprocating movement parallel to that of the stop slide and to and from retracted and extended positions, a toggle member journalled by the housing at a location between the stop and start slides, means pivotally connecting the stop and start slides to the toggle member whereby reciprocating movement of the slides will effect oscillating movement of the toggle member, a resilient coil spring in associated relation with the toggle member for tensioning the member into off-center positions on respective sides of a central plane passing through the journalling axis, a reciprocable switch actuating bar mounted for movement in a plane at approximately right angles to the movement of the slides, means pivotally connecting the switch actuating bar to the toggle member so that oscillating movement of the member will alternately project and retract the said bar, a thermal overload release member mounted by the housing for reciprocating movement in a plane parallel to the switch actuating bar, resilient means for yieldingly forcing the release member into a protruded position, a heat responsive spindle assembly supported by the housing and operative to latch the said release member in a retracted position, and said release member and the stop slide being so constructed and arranged that actuation of the slide to oscillate the toggle member is effective to cam the release member into a retracted position.

9. In actuating means for switch mechanism having normally closed switch contacts, said actuating means including a housing, a stop slide mounted by the housing for reciprocating movement to and from retracted and projected positions, a start slide also mounted by the housing for reciprocating movement parallel to that of the stop slide and to and from retracted and extended positions, a toggle member journalled by the housing and located between the stop and start slides, means pivotally connecting the start and stop slides to the toggle member whereby reciprocating movement of the slides produces oscillating movement of the toggle member, a resilient coil spring in associated relation with the toggle member for tensioning the member into off center positions on respective sides of a central plane passing through the journalling axis, whereby when said toggle member is in one off center position the stop slide is retracted and the start slide is extended and when the toggle member is in its other off center position the stop slide is extended and the start slide is retracted, a reciprocable switch actuating bar mounted for movement in a plane at approximately right angles to the movement of the slide, means pivotally connecting the switch actuating bar to the toggle member so that oscillating movement of the member will alternately project and retract the said bar, a thermal overload release member mounted by the housing for reciprocating movement to and from projected and retracted positions similar in all respects to that of the switch actuating bar, resilient means for yieldingly forcing the release member into a projected position, a heat responsive spindle assembly supported by the housing and operative to latch the said release member in a retracted position, and said release member and the stop slide being so constructed and arranged that actuation of the slide to oscillate the toggle member is effective to cam the release member into a retracted position in the event the member is located in a projected position.

10. Actuating means for switch mechanism as defined by claim 9 wherein the thermal overload release member is located relatively adjacent the switch actuating bar, and wherein the release member and stop slide are so constructed and arranged that the release member is provided with a camming surface located below a camming surface on the stop slide so that actuation of the slide to oscillate the toggle member effects a camming action between the parts to move the release member into a retracted position in the event the same has been tripped into a projected position.

References Cited in the file of this patent

UNITED STATES PATENTS

| | | |
|---|---|---|
| 472,610 | Stanley | Apr. 12, 1892 |
| 499,646 | Russell | June 13, 1893 |
| 635,587 | Pettis | Oct. 24, 1899 |
| 1,003,111 | Jakobsen et al. | Sept. 12, 1911 |
| 1,328,481 | Baker | Jan. 20, 1920 |
| 2,416,253 | Furnas | Feb. 18, 1947 |
| 2,689,896 | Kuhn et al. | Sept. 21, 1954 |